(No Model.)
R. S. WARING.
ELECTRIC CABLE.
No. 294,545. Patented Mar. 4, 1884.
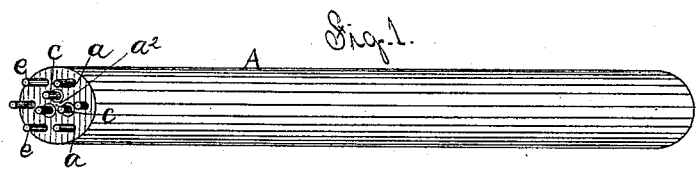
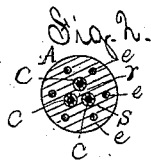
Witnesses
C. L. Parker
R. H. Whittlesey
Inventor
Richard S. Waring
by George H. Christy.
His Attorney

UNITED STATES PATENT OFFICE.

RICHARD S. WARING, OF PITTSBURG, PENNSYLVANIA.

ELECTRIC CABLE.

SPECIFICATION forming part of Letters Patent No. 294,545, dated March 4, 1884.

Application filed August 9, 1883. (No model.)

*To all whom it may concern:*

Be it known that I, RICHARD S. WARING, a citizen of the United States, residing at Pittsburg, county of Allegheny, State of Pennsylvania, have invented or discovered a new and useful Improvement in Electric Cables; and I do hereby declare the following to be a full, clear, concise, and exact description thereof, reference being had to the accompanying drawings, making a part of this specification, in which—like letters indicating like parts—

Figure 1 is a perspective view of my improved electric cable, and Fig. 2 is a transverse sectional view of the same.

My invention relates to certain improvements in compound electric cables, designed more particularly for use in water; and, in general terms, it consists of a cable having a solid, as distinguished from a tubular, body of soft ductile metal or metallic alloy, such body inclosing insulated conducting-wires, and also a series of strengthening-wires, each within its appropriate passage through the body, the conducting-wires being arranged in close proximity around the solid core of soft metal, and the strengthening-wires being arranged in circular order around the conducting-wires, as hereinafter more fully described and claimed.

In Patent No. 268,059, granted to me November 28, 1882, I have described and claimed a cable having a tubular body of lead, inclosing within such body a series of insulated conducting-wires, and also a series of hard-metal wires surrounding and protecting the conducting-wires.

The purpose of my present invention is to secure a cheaper cable by employing a smaller quantity of lead and so disposing the same as to utilize it to the best advantage. I also have in view an improvement in the cable by making its center or core solid, as distinguished from tubular, whereby danger of minute pores or holes in the lead, characteristic of pipe-like forms, is avoided, and air and all other agencies liable to convey moisture into the interior of a tubular cable are wholly excluded.

In cables having a tubular body it is extremely difficult to secure such perfectness, both at joints, and also throughout the entire length of cable, that when laid in water some moisture will not find its way to the interior; and even moist air having access to the tubular interior may deposit its moisture on the inner wall, and this moisture, from whatever source it may come, may in time find access through pores or minute holes in the lead body to the insulating material surrounding a wire or wires. The requisite elements are thus supplied to excite or produce electric or electrolytic action between the lead and copper usually employed in this class of cables for conductors, and such action, though weak, is very detrimental to good working of the cable.

In order to prevent these and other like evils in the class of cables referred to, I make my improved cable as follows:

A body, A, is formed of lead or other equivalent soft ductile metal or alloy adapted to make adhesive union when subjected to pressure within a lead-press. The form and size in cross-section of this body is determined by the die-opening of the press. I prefer a smooth, rounded form, as shown; but this may be varied, as desired, without departing from my invention. Within this body of soft metal are inclosed a number of insulated conducting-wires, $c$, each in its appropriate or separate passage, $a$, made longitudinally through the body. These wires $c$ are placed in close proximity around the solid core or center $a^2$ of the soft-metal body, the inner walls of covering between such wires being comparatively thin but continuous or unbroken, thereby affording complete metallic separation of the wires for the purpose of preventing electrical induction. It has been found by experience that comparatively light walls will afford the desired protection in this respect, and therefore that the wires may be brought into close proximity, so as to be covered through the inner spaces between wires with a comparatively small quantity of lead. Difficulty has been experienced, however, in securing the requisite flow and pressure of lead into the spaces between wires, especially when, as in the present cable, the conducting-wires are surrounded by another or outer series of wires. To overcome or lessen this difficulty, I prefer to include three conducting-wires, $c$, in the cable-body, and place them in triangular arrangement about the center $a^2$, so that comparatively wide openings may be afforded between any two of the wires for entrance of lead between them, though the space to be filled within the circle of wires is very small. With three wires arranged as shown a minimum of inner or central space is afforded with a relatively wide passage or approach between wires to such spaces. This arrangement of the three wires has advantage, therefore, not only in facilitating the formation of a solid core and continuous, unbroken inner walls of covering, but also in including the wires in comparatively small space and covering them with a minimum quantity of lead.

In order to protect the wires from exterior injury, the greater part of the metal of the covering is disposed around the exterior of the conducting-wires. This cable is designed, however, more particularly for laying in water, where it may be subject to rubbing movement on stones or gravel, and exposed to abrasion by floating substances, like ice, drift, boats, &c.

In order to prevent injurious wearing away of the exterior lead covering, and also to give the cable greater tensile strength, so that it may sustain its own weight if suspended some distance over a rough bed or in air, hard-metal wires $e$ are inclosed in separate passages in the lead body, such wires being, by preference, double the number of conducting-wires, and arranged in circular order around the conducting-wires and occurring on either side of the radial lines produced through the latter wires. This order of occurrence is given with reference to introducing a flow or supply of lead from the exterior between each two of the outer wires, $c$, and directing such flow both upon or against the inner wires, $c$, as at $s$, Fig. 2, and also into the spaces between wires, as at $r$. By these features of construction and arrangement I am enabled to include the three conducting-wires $c$ and the surrounding series of strengthening and protecting wires $e$ within a cable having but a trifle larger area in cross-section and employing but little more lead than is ordinarily employed for a single wire. This is of material advantage, not only in point of economy, but also in combining lightness and strength with an increased number of conductors, thereby adapting it especially to the peculiar requirements of cables laid in water or suspended in air; also, by making the enveloping body of metal solid at the center, as distinguished from tubular, greater security is afforded against entrance of moisture, and also a more compact and convenient form and construction of cable is secured.

In a separate application for patent, filed by me of even date herewith, I have described and claimed a cable having a solid body of lead covering inclosing three insulated conducting-wires arranged similar to the wires $c$ in the present invention, and therefore I make no claim herein to a cable having such features of construction, alone considered. Also, in another application for patent, I have described and claimed a new and improved construction of mandrel, specially adapted to make the cable described herein. I do not wish, however, to limit my present invention by any particular means or method of making the same, as other forms of mandrels may be employed for this purpose, if desired.

It is not essential that the lead employed be chemically pure; and, in fact, any soft ductile metallic alloy having like properties for the purposes in view may be used.

I claim herein as my invention—

1. An electric cable having a solid body of soft ductile metal or metallic alloy, inclosing insulated conducting-wires, each in its appropriate passage through the body, such wires being arranged in close proximity around the solid core or center of the body, with a series of strengthening-wires inclosed within the soft-metal body, such strengthening-wires being arranged in circular order around the conducting-wires, substantially as set forth.

2. An electric cable having a solid body of soft ductile metal or metallic alloy, inclosing three insulated conducting-wires, each in its appropriate passage through the body, such wires being arranged in close proximity at intervals around the solid core or center of the body, with a series of strengthening-wires inclosed within the soft-metal body, such strengthening-wires being arranged at intervals around the conducting-wires, substantially as set forth.

3. An electric cable having a body, A, of soft ductile metal or alloy, inclosing three insulated conducting-wires, $c$, each in its appropriate passage through the body, such wires being placed in triangular relationship and in close proximity around the solid metal center $a^2$, with a series of strengthening-wires, $e$, inclosed in the body of soft metal, such strengthening-wires being double the number of conducting-wires $c$, and arranged around the latter wires on either side of radial lines produced through the conducting-wires, substantially as and for the purposes set forth.

In testimony whereof I have hereunto set my hand.

RICHARD S. WARING.

Witnesses:
C. L. PARKER,
R. H. WHITTLESEY.